United States Patent
Zhang et al.

(10) Patent No.: US 11,799,353 B2
(45) Date of Patent: Oct. 24, 2023

(54) DENOISING OPTIMIZATION METHOD FOR AC TRACTION MOTOR BY CHAMFERING STATOR TOOTH SHOULDER WITH INSCRIBED ARC

(71) Applicant: HUNAN UNIVERSITY OF SCIENCE AND TECHNOLOGY, Hunan (CN)

(72) Inventors: Xiaoping Zhang, Hunan (CN); Donghao Liu, Hunan (CN); Bo Fu, Hunan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 266 days.

(21) Appl. No.: 17/212,088

(22) Filed: Mar. 25, 2021

(65) Prior Publication Data
US 2021/0211016 A1    Jul. 8, 2021

(30) Foreign Application Priority Data
Dec. 31, 2020 (CN) .......................... 202011632988.5

(51) Int. Cl.
*H02K 5/24* (2006.01)
*G06F 30/23* (2020.01)

(52) U.S. Cl.
CPC .............. *H02K 5/24* (2013.01); *G06F 30/23* (2020.01); *H02K 2213/03* (2013.01)

(58) Field of Classification Search
CPC ...... H02K 1/265; H02K 17/165; H02K 17/16; H02K 17/20; H02K 17/205; H02K 2213/03; G06F 30/10; G06F 30/23; G06F 2119/10
(Continued)

(56) References Cited

U.S. PATENT DOCUMENTS

| | | | |
|---|---|---|---|
| 1,761,836 A * | 6/1930 | James | H02K 23/42 310/192 |
| 5,220,228 A * | 6/1993 | Sibata | H02K 21/16 310/216.093 |

(Continued)

FOREIGN PATENT DOCUMENTS

| | | | | |
|---|---|---|---|---|
| CN | 104410236 A | * | 3/2015 | ............... H02K 1/14 |
| CN | 110601464 | * | 8/2015 | |

(Continued)

OTHER PUBLICATIONS

Mass Ionized Particle Optimization Algorithm.*

*Primary Examiner* — Maged M Almawri

(57) ABSTRACT

A denoising optimization method for an AC traction motor by chamfering a stator tooth shoulder includes taking an angular vertex of the stator tooth shoulder as an end point, obtaining two points equidistantly along two sides of a stator tooth shoulder angle from the end point; and using the two points as tangent points D1 and D2 of the inscribed arc; making the inscribed arc of the tooth shoulder angle through the two tangent points D1 and D2, cutting off the tooth shoulder angle along the inscribed arc, and adjusting an oblique height $H_{S1}$ of a stator tooth pole shoe. The invention obtains optimal values of a chamfering size and oblique height of a stator tooth slot pole shoe by adjusting the oblique height of the stator tooth pole shoe and adopting a particle swarm optimization algorithm.

2 Claims, 3 Drawing Sheets

(58) Field of Classification Search
USPC ........... 310/216.069, 211, 216.071, 216.072, 310/216.019, 216.106, 187, 216.129, 310/216.091–216.93
See application file for complete search history.

(56) References Cited

U.S. PATENT DOCUMENTS

| | | | | |
|---|---|---|---|---|
| 5,977,680 | A * | 11/1999 | Lin | H02K 1/146 310/216.092 |
| 6,194,800 | B1 * | 2/2001 | Maruyama | F04D 19/048 310/90.5 |
| 6,313,558 | B1 * | 11/2001 | Abukawa | H02K 29/03 310/429 |
| 6,940,205 | B1 * | 9/2005 | Murakami | H02K 21/16 310/156.01 |
| 7,382,076 | B2 * | 6/2008 | Miyamori | G11B 17/028 |
| 7,408,279 | B2 * | 8/2008 | Murakami | H02K 21/16 310/156.28 |
| 7,592,733 | B2 * | 9/2009 | Naitou | H02K 1/148 310/156.33 |
| 7,728,481 | B2 * | 6/2010 | Lee | H02K 1/165 310/216.093 |
| 8,207,648 | B2 * | 6/2012 | Li | H02K 16/02 310/216.069 |
| 8,847,460 | B2 * | 9/2014 | Jurkovic | H02K 29/03 310/216.096 |
| 9,966,804 | B2 * | 5/2018 | Yu | H02K 29/03 |
| 10,256,681 | B2 * | 4/2019 | Bastien | H02K 1/278 |
| 10,320,254 | B2 * | 6/2019 | Nakano | H02K 11/33 |
| 10,374,471 | B2 * | 8/2019 | Shelton | H02K 29/03 |
| 2005/0194858 | A1 | 9/2005 | Ahn | H02K 3/325 310/216.114 |
| 2006/0091758 | A1 | 5/2006 | Ahn | H02K 1/148 310/216.001 |
| 2007/0205687 | A1 * | 9/2007 | Murakami | H02K 1/278 310/156.28 |
| 2007/0205688 | A1 * | 9/2007 | Murakami | H02K 21/16 310/216.069 |
| 2007/0216253 | A1 * | 9/2007 | Shendi | H02K 1/165 310/180 |
| 2007/0278892 | A1 * | 12/2007 | Lee | H02K 1/185 310/216.093 |
| 2011/0169369 | A1 * | 7/2011 | Liang | H02K 1/16 310/216.092 |
| 2012/0043849 | A1 * | 2/2012 | Yoneda | H02K 1/16 29/596 |
| 2012/0326550 | A1 * | 12/2012 | Kinpara | H02K 1/278 310/215 |
| 2013/0147309 | A1 * | 6/2013 | Rahman | H02K 1/24 310/216.092 |
| 2014/0028148 | A1 * | 1/2014 | Shelton | H02K 1/146 310/216.092 |
| 2015/0188377 | A1 * | 7/2015 | Kim | H02K 29/03 417/415 |
| 2016/0197524 | A1 * | 7/2016 | Bastien | H02K 1/278 310/216.092 |
| 2016/0197525 | A1 * | 7/2016 | Cho | H02K 1/146 310/216.093 |
| 2021/0240874 | A1 * | 8/2021 | Zhang | G06F 30/10 |
| 2022/0255409 | A1 * | 8/2022 | Zhang | H02K 15/024 |

FOREIGN PATENT DOCUMENTS

| | | | | |
|---|---|---|---|---|
| CN | 108808899 A | * | 11/2018 | ............ H02K 1/08 |
| CN | 110417138 A | * | 11/2019 | |
| CN | 110601464 A | | 12/2019 | |
| CN | 209982190 U | * | 1/2020 | |
| DE | 4325676 A1 | * | 2/1994 | ............ H02K 37/18 |
| JP | 2015015842 A | * | 1/2015 | ............ H02K 1/148 |
| JP | 5928836 B2 | * | 6/2016 | ............ H02K 1/148 |
| KR | 20090106087 A | * | 1/2009 | |
| KR | 20090004468 A | * | 4/2009 | |
| KR | 20100005737 | * | 1/2010 | |
| KR | 20160027396 A | * | 7/2016 | |

\* cited by examiner

```
┌─────────────────────────────────────────────────────────────┐
│ Determining value ranges of an inscribed arc chamfering    │
│ size and an oblique height of a stator tooth pole shoe     │
│ according to a structural size of a stator tooth shoulder  │
│ of an AC traction motor                                     │
└─────────────────────────────────────────────────────────────┘
                            ↓
┌─────────────────────────────────────────────────────────────┐
│ Selecting n groups of data successively within the value   │
│ ranges determined in the step 1) according to certain      │
│ spacing for the inscribed arc chamfering size and the      │
│ oblique height of the stator tooth pole shoe               │
└─────────────────────────────────────────────────────────────┘
                            ↓
┌─────────────────────────────────────────────────────────────┐
│ Performing finite-element analysis according to the data   │
│ of the inscribed arc chamfering size and oblique height of │
│ the stator tooth pole shoe determined in the step 2) to    │
│ obtain corresponding electromagnetic noise and efficiency  │
│ data of the motor                                           │
└─────────────────────────────────────────────────────────────┘
                            ↓
┌─────────────────────────────────────────────────────────────┐
│ Performing value fitting for the electromagnetic noise and │
│ efficiency obtained in the step 3) and corresponding data  │
│ of the inscribed arc chamfering size and the oblique       │
│ height of the stator tooth pole shoe to respectively       │
│ obtain function relations fs(x,y) and fe(x,y) between the  │
│ electromagnetic noise and the inscribed arc chamfering     │
│ size and the oblique height of the stator tooth pole shoe  │
│ and between the efficiency and the inscribed arc           │
│ chamfering size and the oblique height of the stator       │
│ tooth pole shoe                                             │
└─────────────────────────────────────────────────────────────┘
                            ↓
┌─────────────────────────────────────────────────────────────┐
│ By taking the inscribed arc tooth shoulder chamfering size │
│ and the oblique height of the stator tooth pole shoe as an │
│ optimization object and taking electromagnetic noise and   │
│ efficiency of the motor as an optimization target,         │
│ performing multi-target optimization for the noise         │
│ function fs(x,y) and the efficiency function fe(x,y) by    │
│ adopting a particle swarm optimization algorithm to obtain │
│ optimal values of the inscribed arc tooth shoulder         │
│ chamfering size and the oblique height of the stator tooth │
│ pole shoe                                                   │
└─────────────────────────────────────────────────────────────┘
```

Fig. 1

DENOISING OPTIMIZATION METHOD FOR AC TRACTION MOTOR BY CHAMFERING STATOR TOOTH SHOULDER WITH INSCRIBED ARC

CROSS-REFERENCE TO RELATED APPLICATIONS

This application claims the benefit of priority from Chinese Patent Application No. 202011632988.5, filed on Dec. 31, 2020. The content of the aforementioned application, including any intervening amendments thereto, is incorporated herein by reference in its entirety.

TECHNICAL FIELD

The present invention relates to the field of motor noise reduction, and particularly to a denoising optimization method for an AC traction motor based by chamfering a stator tooth shoulder.

BACKGROUND OF THE PRESENT INVENTION

AC traction motors have been widely used in various fields because of the advantages of simple and firm structure, reliable operation, large power and high rotation speed. However, the motor produces loud noise during operation, which not only has an adverse effect on the working environment and human health, but also limits the promotion and application of the motor in certain special fields. Therefore, to study the noise reduction of the motor has great significance.

A main factor causing excessively loud noise of the AC traction motors is electromagnetic noise produced during the operation. For this reason, extensive research has been carried out in China and abroad on how to reduce the electromagnetic noise of the motors, and various methods for reducing the electromagnetic noise have been proposed, including methods of changing a proportion of motor slots, adopting a rotor beveled slot design, changing a length of a motor air gap, improving an assembling process of the motor and optimizing motor control. Although a certain effect is achieved, there is still a long way for meeting the actual noise reduction requirements.

SUMMARY OF THE PRESENT INVENTION

To solve the above technical problems, the present invention provides a denoising optimization method for an AC traction motor by chamfering a stator tooth shoulder.

The technical solution of the present invention for solving the above problems is as follows: a denoising optimization method for an AC traction motor by chamfering a stator tooth shoulder specifically includes:

Taking an angular vertex of a stator tooth shoulder as an end point, obtaining two points equidistantly along two sides of a stator tooth shoulder angle from the end point; and using the two points as tangent points D1 and D2 of the inscribed arc; then making the inscribed arc of the tooth shoulder angle through the two tangent points D1 and D2, cutting off the tooth shoulder angle along the inscribed arc, and adjusting an oblique height $H_{S1}$ of a stator tooth pole shoe; and determining the tangent points D1 and D2 of the inscribed arc and the oblique height $H_{S1}$ of the stator tooth pole shoe includes the specific steps as follows:

1) determining value ranges of an inscribed arc chamfering size and the oblique height of the stator tooth pole shoe according to a structural size of the stator tooth shoulder of the AC traction motor;
2) selecting n groups of data successively within the value ranges determined in step 1) according to certain spacing for the inscribed arc chamfering size and the oblique height of the stator tooth pole shoe;
3) performing finite-element analysis according to the data of the inscribed arc chamfering size and the oblique height of the stator tooth pole shoe determined in the step 2) to obtain corresponding electromagnetic noise and efficiency data of the motor;
4) performing value fitting for the electromagnetic noise and efficiency obtained in the step 3) and corresponding data of the inscribed arc chamfering size and oblique height of the stator tooth pole shoe to respectively obtain function relations $f_s(x,y)$ and $f_e(x,y)$ between the electromagnetic noise and the inscribed arc chamfering size and the oblique height of the stator tooth pole shoe and between the efficiency and the inscribed arc chamfering size and the oblique height of the stator tooth pole shoe;
5) by taking the inscribed arc tooth shoulder chamfering size and the oblique height of the stator tooth pole shoe as an optimization object and taking electromagnetic noise and efficiency of the motor as an optimization target, performing multi-target optimization for the noise function $f_s(x,y)$ and the efficiency function $f_e(x,y)$ by adopting a particle swarm optimization algorithm to obtain optimal values of the inscribed arc tooth shoulder chamfering size and oblique height of the stator tooth pole shoe.

In the above denoising optimization method for the AC traction motor by chamfering the stator tooth shoulder, the function relations $f_s(x,y)$ and $f_e(x,y)$ between the electromagnetic noise and the inscribed arc chamfering size and the oblique height of the stator tooth pole shoe and between the efficiency and the inscribed arc chamfering size and the oblique height of the stator tooth pole shoe obtained in the step 4) are specifically as follows:

(1) The function relation between the electromagnetic noise and the inscribed arc chamfering size and the oblique height of the stator tooth pole shoe is:

$$f_s(x,y)=a_{00}+a_{10}x+a_{01}y+a_{20}x^2+a_{11}xy+a_{02}y^2+a_{30}x^3+a_{21}x^2y+a_{12}xy^2+a_{03}y^3+a_{40}x^4+a_{31}x^3y+a_{22}x^2y^2+a_{13}xy^3+a_{04}y^4$$

(2) The function relation between the efficiency and the inscribed arc chamfering size and the oblique height of the stator tooth pole shoe is:

$$f_e(x,y)=b_{00}+b_{10}x+b_{01}y$$

In the equations: $f_s(x,y)$ and $f_e(x,y)$ are the noise function and the efficiency function respectively; x is the inscribed arc chamfering size, y is the oblique height of the stator tooth pole shoe, $x<H_{S0}$ and $y<H_{S1}$; $a_{00}$, $a_{10}$, $a_{01}$, $a_{20}$, $a_{11}$, $a_{02}$, $a_{30}$, $a_{21}$, $a_{12}$, $a_{03}$, $a_{40}$, $a_{31}$, $a_{22}$, $a_{13}$ and $a_{04}$ are coefficients of the electromagnetic noise function respectively, and $b_{00}$, $b_{10}$ and $b_{01}$ are coefficients of the efficiency function respectively.

In the above denoising optimization method for the AC traction motor by chamfering the stator tooth shoulder, performing the multi-target optimization for the noise function $f_s(x,y)$ and the efficiency function $f_e(x,y)$ by adopting the particle swarm optimization algorithm in the step 5) specifically includes the following steps:

Step (1): initializing particle swarm parameters: determining a population size M, a memory pool size N, a particle vector dimension D and maximum iteration times $k_{max}$, and randomly initializing a particle position and speed;

Step (2): calculating a fitness value and updating a Pareto set: inputting various particle vectors into an electromagnetic noise and efficiency model of the AC traction motor to obtain the fitness value of the particle, i.e. the electromagnetic noise and efficiency data of the AC traction motor, calculating an individual extreme value, and storing a superior solution into the Pareto set;

Step (3): updating the individual extreme value and a global extreme value: comparing the current fitness value of the particle with the fitness extreme value of the individual extreme value of the particle, and if the current fitness value of the particle is less than the fitness value of the individual extreme value of the particle, the current position of the particle becomes a new individual extreme value of the particle; and selecting a global optimal extreme value of the particle from the Pareto solution set;

Step (4): updating the particle speed and position;

Step (5): judging whether the iteration times reaches a maximum value; if the iteration times reaches the maximum value, outputting the Pareto set; otherwise, returning to step (2);

Step (6): selecting an optimal solution: removing solutions with the efficiency less than the initial efficiency of the motor in the Pareto solution set, calculating an evaluation value of the surplus solutions by constructing a decision weight function, and selecting the optimal solution according to the evaluation value, thereby obtaining the optimal values of the inscribed arc tooth shoulder chamfering size and the oblique height of the stator tooth pole shoe.

In the above method for reducing the noise and chamfering the stator tooth shoulder of the AC traction motor based on the inscribed arc, the decision weight function g(x,y) constructed in the step (6) is specifically as follows:

$$g(x,y)=k_1 f_s(x,y)+k_2 f_e(x,y)$$

In the equation, g(x,y) is the decision weight function; $f_s(x,y)$ and $f_e(x,y)$ are the noise function and the efficiency function respectively; and $k_1$ is a weight coefficient of the noise function, $k_2$ is a weight coefficient of the efficiency function, and $k_1+k_2=1$.

The present invention has the beneficial effects: inscribed arc-type chamfering treatment is proposed for the stator tooth shoulder of the AC traction motor in the present invention. The present invention obtains optimal values of the chamfering size and the oblique height of the stator tooth slot pole shoe by adjusting the oblique height of the stator tooth pole shoe and adopting the particle swarm optimization algorithm, thereby achieving a purpose of not only improving the operation efficiency of the motor, but also effectively reducing the electromagnetic noise of the motor.

BRIEF DESCRIPTION OF THE DRAWINGS

FIG. 1 is a flow chart of a method for obtaining values of an inscribed arc chamfering size and oblique height of a stator tooth slot pole shoe in the present invention.

DETAILED DESCRIPTION OF THE PRESENT INVENTION

The present invention is further described below in conjunction with the drawings and embodiments.

Figure 2:
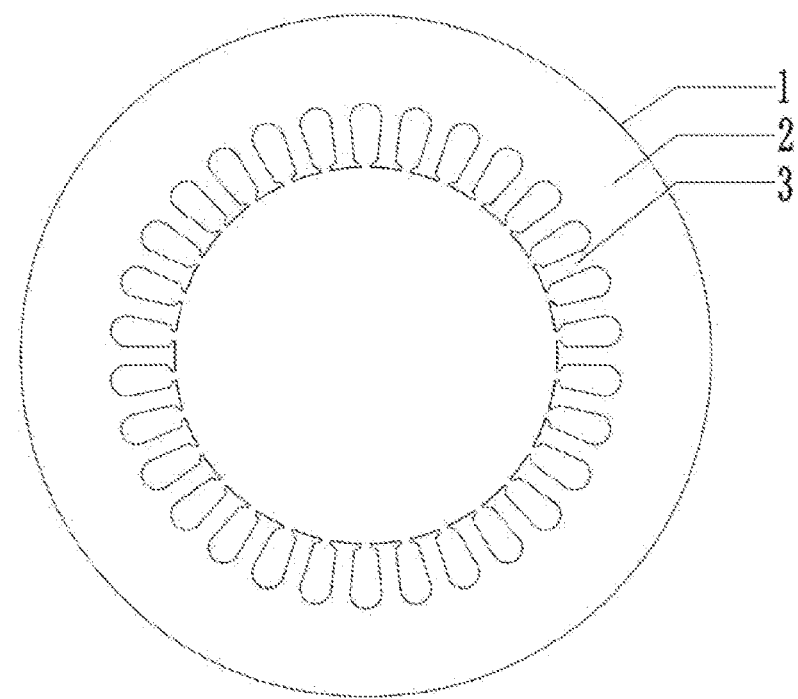
FIG. 2 is a structural schematic diagram of an AC traction motor stator in an embodiment of the present invention.

As shown in FIG. 2, FIG. 2 is a structural schematic diagram of an AC traction motor stator in an embodiment of the present invention. Reference numerals in FIG. 2: 1—stator iron core; 2—yoke portion of the stator iron core; 3—tooth portion of the stator iron core.

Figure 3:
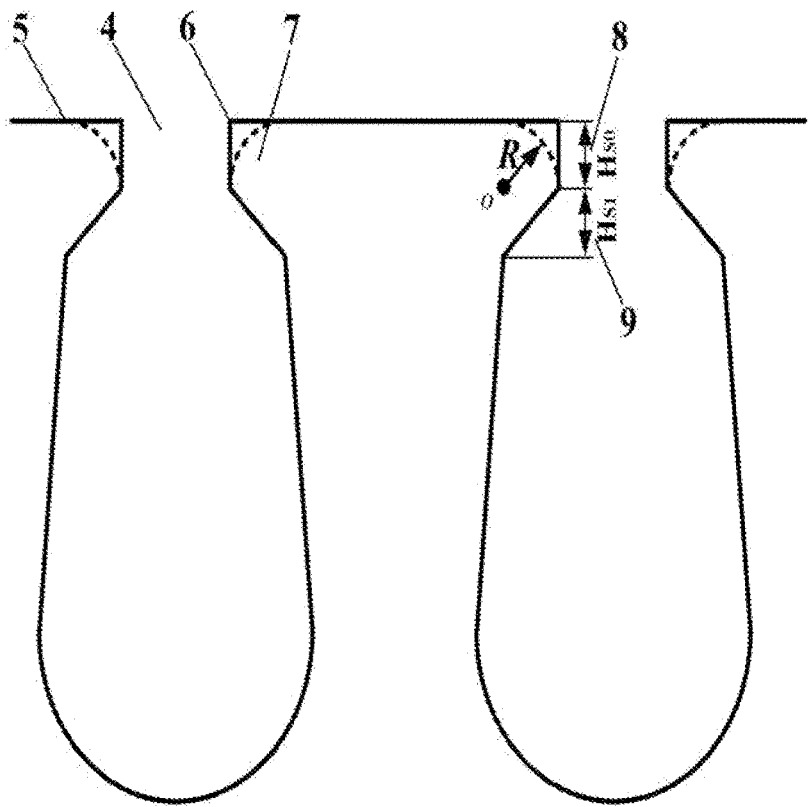
FIG. 3 is a schematic diagram of a stator tooth portion of the AC traction motor in an embodiment of the present invention.
Figure 4:
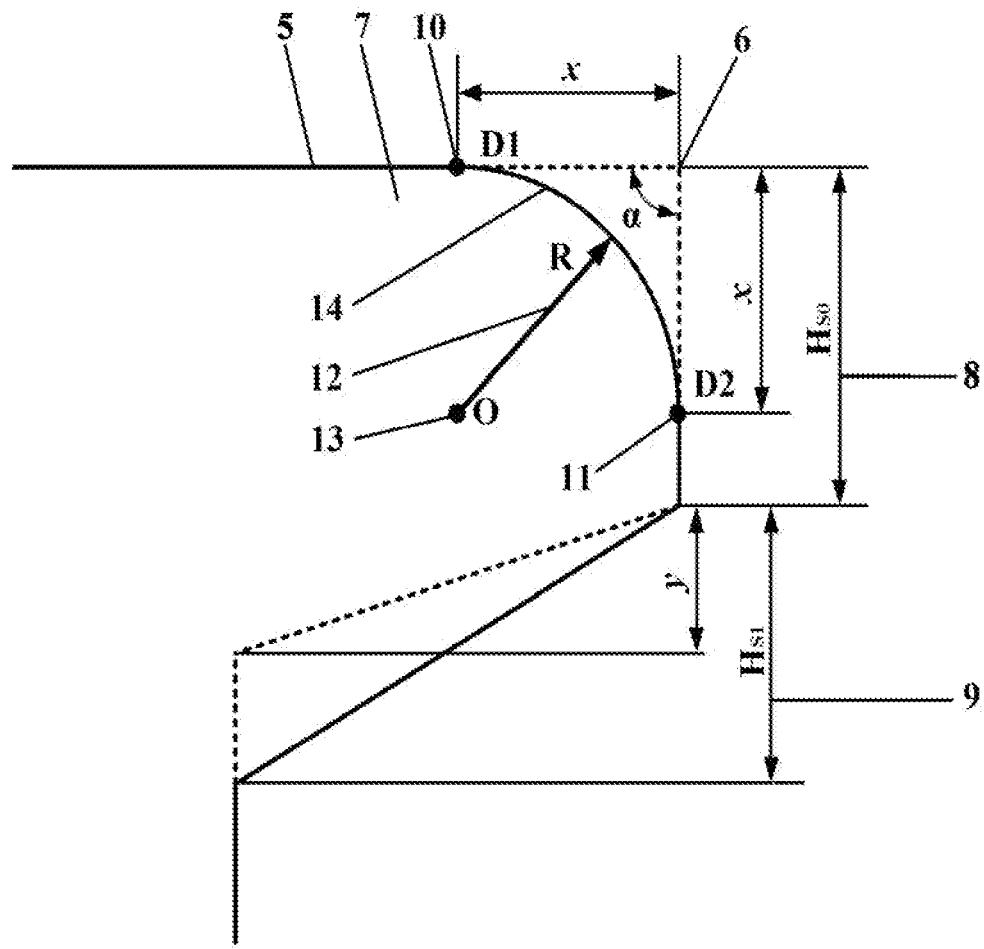
FIG. 4 is a schematic diagram of inscribed arc-type chamfering of the stator tooth shoulder of the AC traction motor in an embodiment of the present invention.

As shown in FIG. 3, FIG. 3 is a schematic diagram of a stator tooth portion of the AC traction motor in an embodiment of the present invention. As shown in FIG. 4, FIG. 4 is a schematic diagram of inscribed arc-type chamfering of the stator tooth shoulder of the AC traction motor in an embodiment of the present invention. In conjunction with FIG. 3 and FIG. 4, reference numerals in the drawings: 4—stator notch; 5—tooth top; 6—tooth shoulder angular vertex; 7—tooth shoulder; 8—notch height $H_{S0}$, 9—oblique height $H_{S1}$ of a stator tooth slot pole shoe; 10,11—tangent points D1 and D2 of an inscribed arc and two sides of the stator tooth shoulder; 12—radius R of the inscribed arc; 13—center O of the inscribed arc; 14—inscribed arc.

The present embodiment keeps a rotor structure of the motor unchanged and achieves the purposes of effectively reducing the electromagnetic noise of the motor and improving the efficiency by performing inscribed arc-type chamfering for the tooth shoulders 7 at two sides of a tooth portion 3 of a motor stator iron core and adjusting the oblique height $H_{s1}$ of the stator tooth pole shoe. Specific implementation steps are shown in FIG. 1.

As shown in FIG. 1, the AC traction motor of a certain model is taken as an example, with main technical parameters of the AC traction motor s shown in Table 1, to introduce specific implementation for obtaining optimal values of an inscribed arc-type chamfering size and an oblique height of a stator tooth slot pole shoe, as follows:

TABLE 1 main parameters of an AC traction motor of a certain model

| Frequency | Voltage | Rated power | Number of pole pairs | Number of stator slots | Number of rotor slots | Height of notch | Oblique height of stator tooth pole shoe |
|---|---|---|---|---|---|---|---|
| 50 Hz | 380 V | 5.5 kW | 1 | 30 | 26 | 0.8 mm | 1.25832 mm |

1) Value ranges of an inscribed arc chamfering size and an oblique height of a stator tooth pole shoe are determined first according to a structural size of a stator tooth shoulder of the AC traction motor, which are (0, 0.8) and (0, 1.25832) respectively;
2) Within the value ranges determined in the step 1), 9 groups of data are selected successively according to certain spacing for the inscribed arc chamfering size and the oblique height of the stator tooth pole shoe;
3) Finite-element analysis is performed according to the data of the inscribed arc chamfering size and the oblique height of the stator tooth pole shoe determined in the step 2) to obtain corresponding electromagnetic noise and efficiency data of the motor, and results are shown in Table 2. In the table, x represents the chamfering size, and y represents the oblique height of the stator tooth pole shoe.

TABLE 2 electromagnetic noise and efficiency data table of the motor

| Group No. | x | y | Noise value | Efficiency |
|---|---|---|---|---|
| 1 | 0 | 1.2 | 67.9 | 86.6601 |
| 2 | 0.2 | 0.9 | 72.948 | 86.6835 |
| 3 | 0.4 | 0.6 | 63.339 | 86.7003 |
| 4 | 0.6 | 0.3 | 74.524 | 86.711 |
| 5 | 0.8 | 0 | 64.79 | 86.7162 |
| 6 | 0 | 0 | 64.794 | 86.8006 |
| 7 | 0.2 | 0.3 | 63.21 | 86.7517 |
| 8 | 0.6 | 0.9 | 71.975 | 86.6425 |
| 9 | 0.8 | 1.2 | 41.4 | 86.5763 |

4) Value fitting is performed for the electromagnetic noise and efficiency obtained in the step 3) and corresponding data of the inscribed arc chamfering size and the oblique height of the stator tooth pole shoe to respectively obtain function relations $f_s(x,y)$ and $f_e(x,y)$ between the electromagnetic noise and the inscribed arc chamfering size and the oblique height of the stator tooth pole shoe and between the efficiency and the inscribed arc chamfering size and the oblique height of the stator tooth pole shoe, which are specifically as follows:

(1) Electromagnetic Noise Function $$f_s(x,y)=65.67+143x-64.73y-695.2x^2+108.3xy+363.1y^2+943.1x^3+19.55x^2y-180.9xy^2-663.2y^3-381.6x^4-115.5x^3y+159.7x^2y^2+17.64xy^3+383.6y^4$$

(2) Efficiency Function $$f_e(x,y)=86.81-0.1109x-0.1041y$$

5) By taking the inscribed arc tooth shoulder chamfering size x and the oblique height y of the stator tooth pole shoe as an optimization object and taking electromagnetic noise and efficiency of the motor as an optimization target, multi-target optimization is performed for the electromagnetic noise function $f_s(x,y)$ and the efficiency function $f_e(x,y)$ by adopting a particle swarm optimization algorithm to obtain optimal values of the inscribed arc tooth shoulder chamfering size and the oblique height of the stator tooth pole shoe, which are specifically as follows: the optimal chamfering size is 0.0744 mm, and the optimal oblique height of the stator tooth pole shoe is 0.6515 mm; and the corresponding electromagnetic efficiency and noise are 55.7403 dBA and 86.7412% respectively.

To further describe the inscribed arc-type chamfering effect for the stator tooth shoulder of the AC traction motor, the motor noise and efficiency of the motor before and after the chamfering treatment with the optimal chamfering size are compared, as shown in Table 3.

TABLE 3

| Chamfering treatment state | Electromagnetic noise value (dBA) | Efficiency (%) |
|---|---|---|
| Before the chamfering | 67.9 | 86.6601 |
| After the chamfering | 55.7 | 86.7412 |

It can be seen that after the inscribed arc-type chamfering treatment is adopted for the stator tooth portion of the AC traction motor, the efficiency is increased, and the electromagnetic noise is lowered by 12.2 dBA, i.e., by 17.97%. Therefore, the application value is good.

What is claimed is:

1. A denoising optimization method for an AC traction motor by chamfering a stator tooth shoulder, comprising: taking an angular vertex of a stator tooth shoulder as an end point, obtaining two points equidistantly along two sides of a stator tooth shoulder angle from the end point; and using the two points as tangent points D1 and D2 of an inscribed arc; then making the inscribed arc of the tooth shoulder angle through the two tangent points D1 and D2, cutting off the tooth shoulder angle along the inscribed arc, and adjusting an oblique height $H_{S1}$ of a stator tooth pole shoe; and determining the tangent points D1 and D2 of the inscribed arc and the oblique height $H_{S1}$ of the stator tooth pole shoe, comprising the specific steps as follows:
   1) determining value ranges of an inscribed arc chamfering size and the oblique height of the stator tooth pole shoe according to a structural size of the stator tooth shoulder of the AC traction motor;
   2) selecting n groups of data successively within the value ranges determined in step 1) according to certain spacing for the inscribed arc chamfering size and the oblique height of the stator tooth pole shoe, wherein n is an integer greater than 0;
   3) performing finite-element analysis according to the data of the inscribed arc chamfering size and the oblique height of the stator tooth pole shoe determined in the step 2) to obtain corresponding electromagnetic noise and efficiency data of the motor;
   4) obtaining a function relation $f_s(x,y)$ between the electromagnetic noise and the inscribed arc chamfering size and the oblique height of the stator tooth pole shoe, wherein $f_s(x,y)$ is expressed as:

$$f_s(x,y)=a_{00}+a_{10}x+a_{01}y+a_{20}x^2+a_{11}xy+a_{02}y^2+a_{30}x^3+a_{21}x^2y+a_{12}xy^2+a_{03}y^3+a_{40}x^4+a_{31}x^3y+a_{22}x^2y^2+a_{13}xy^3+a_{04}y^4$$

and obtaining a function relation $f_e(x,y)$ between the efficiency and the inscribed arc chamfering size and the oblique height of the stator tooth pole shoe, wherein $f_e(x,y)$ is expressed as:

$$f_e(x,y)=b_{00}+b_{10}x+b_{01}y$$

in the equations: $f_s(x,y)$ and $f_e(x,y)$ are the noise function and the efficiency function respectively; x is the inscribed arc chamfering size, y is the oblique height of the stator tooth pole shoe, $x<H_{S0}$ and $y<H_{S1}$; $a_{00}$, $a_{10}$, $a_{01}$, $a_{20}$, $a_{11}$, $a_{02}$, $a_{30}$, $a_{21}$, $a_{12}$, $a_{03}$, $a_{40}$, $a_{31}$, $a_{22}$, $a_{13}$ and $a_{04}$ are coefficients of the electromagnetic noise function respectively, and $b_{00}$, $b_{10}$ and $b_{01}$ are coefficients of the efficiency function respectively, wherein the function relations $f_s(x,y)$ and $f_e(x,y)$ are obtained according to the electromagnetic noise and efficiency obtained in the step 3) and corresponding data of the inscribed arc chamfering size and oblique height of the stator tooth pole shoe;

5) by taking the inscribed arc tooth shoulder chamfering size and the oblique height of the stator tooth pole shoe as variables to be optimized and taking electromagnetic noise and efficiency of the motor as standards to measure an optimization effect, performing multi-target optimization for the electromagnetic noise function $f_s(x,y)$ and the efficiency function $f_e(x,y)$ by adopting a particle swarm optimization algorithm to obtain optimal values of the inscribed arc tooth shoulder chamfering size and the oblique height of the stator tooth pole shoe.

2. The denoising optimization method for the AC traction motor by chamfering the stator tooth shoulder according to claim 1, wherein the step 1) of determining value ranges of the inscribed arc chamfering size and the oblique height of the stator tooth pole shoe is specifically as follows: a distance from the vertex of the stator tooth shoulder angle to a tangent point of two sides is less than a notch height $H_{S0}$ of the motor stator, and the adjustable range of the oblique height of the stator tooth pole shoe should be within an original oblique height $H_{S1}$ of the stator tooth pole shoe.

* * * * *